Nov. 27, 1962  HIROSHI YAMADA  3,066,228
PARAMETER-EXCITED RESONATOR SYSTEM
Filed Aug. 21, 1956  4 Sheets-Sheet 1
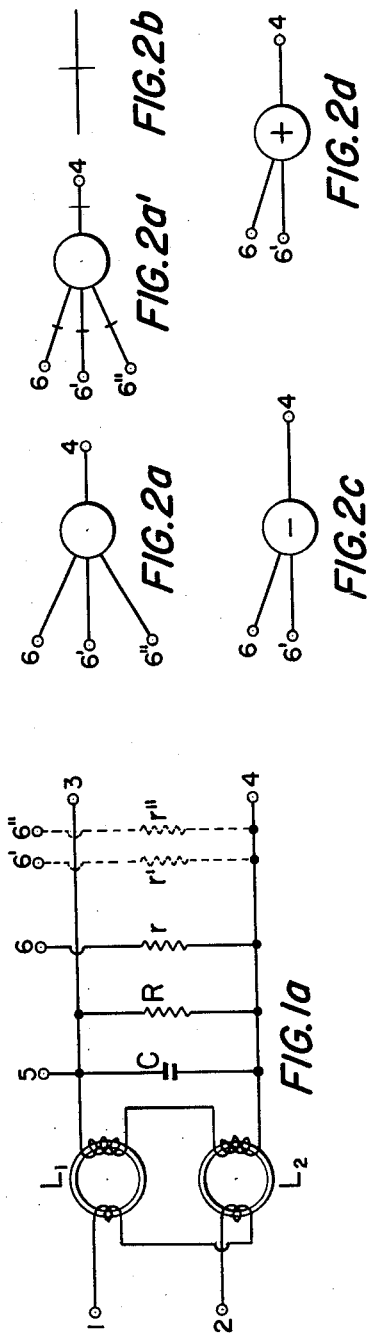
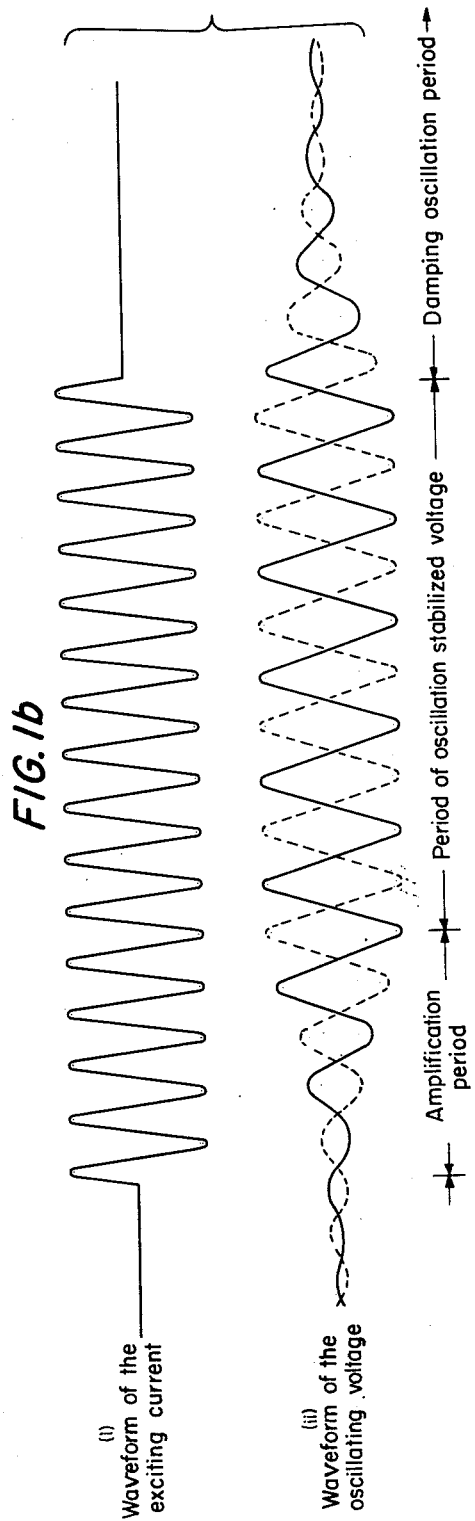

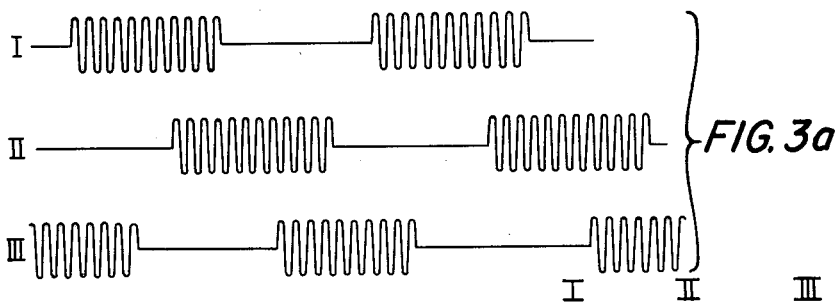
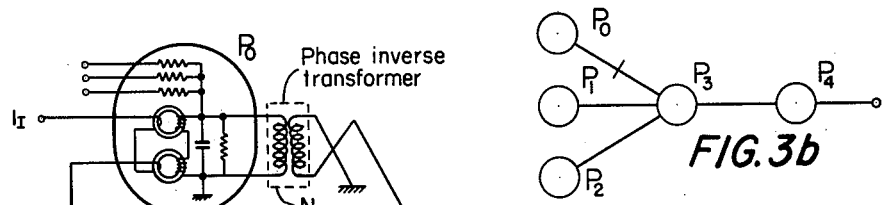
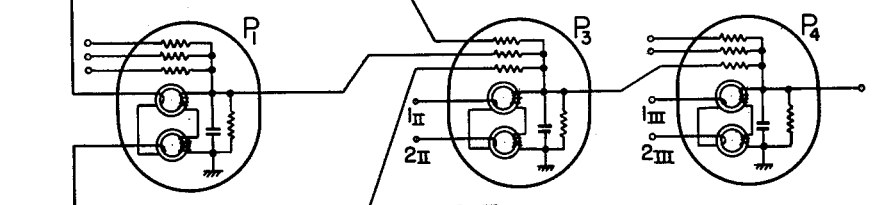
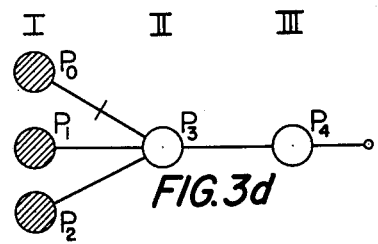
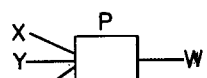
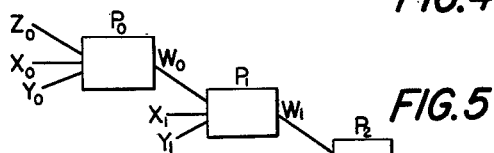
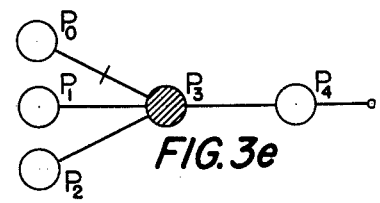
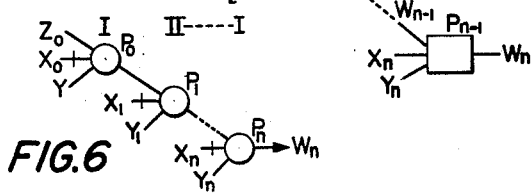
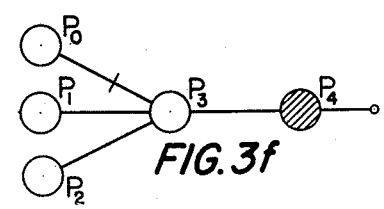

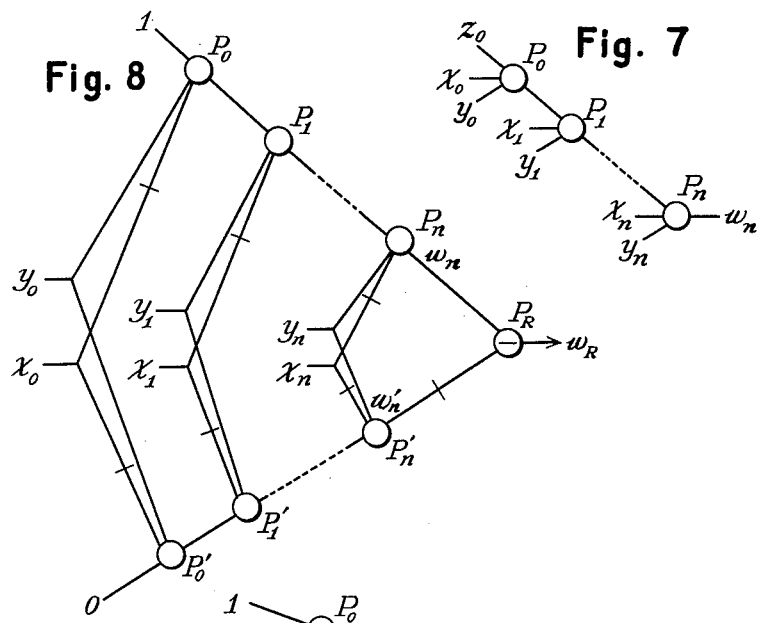
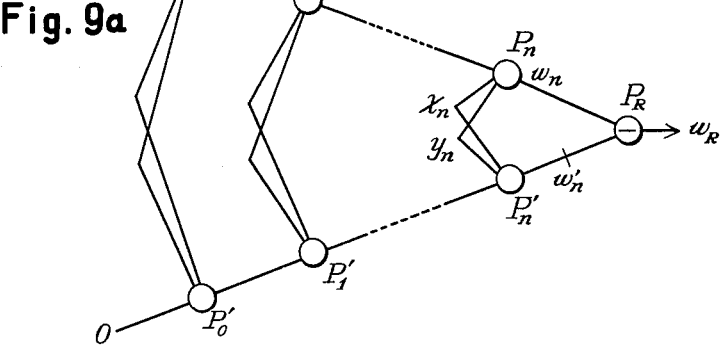
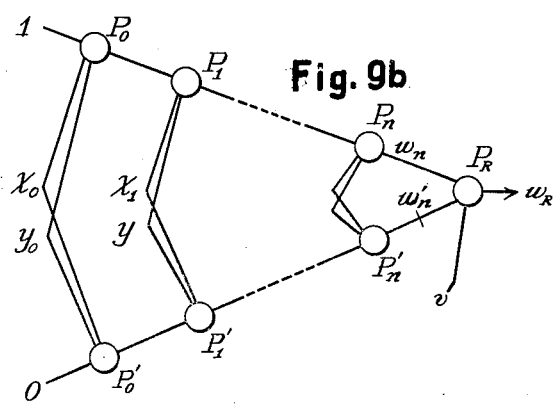

Nov. 27, 1962      HIROSHI YAMADA      3,066,228
PARAMETER-EXCITED RESONATOR SYSTEM
Filed Aug. 21, 1956      4 Sheets-Sheet 4

United States Patent Office 3,066,228
Patented Nov. 27, 1962

3,066,228
PARAMETER-EXCITED RESONATOR SYSTEM
Hiroshi Yamada, 1001 Kami-Ikegami-machi,
Ota-ku, Tokyo, Japan
Filed Aug 21. 1956, Ser. No. 605,402
Claims priority, application Japan Aug. 27, 1955
7 Claims. (Cl. 307—88)

This invention relates generally to parameter-excited resonator circuits, and more particularly to utilization of such circuits as circuit elements in electrical computers.

One object of the present invention is to provide a novel computing circuit which is remarkably simple, compact and of low-cost, and nevertheless reliable in operation.

Another object of the present invention is to provide a novel computing circuit which enables the determination of a numerical relation between two numbers with more implicity, more rapidity, and lower power requirement than circuits employing the usual electronic tubes which perform equivalent functions.

Various other objects and advantages of the present invention will be obvious from the following descriptions and appended claims, given with reference to the accompanying drawings wherein:

FIG. 1(a) is a diagram showing a parametron circuit to be employed as circuit elements according to the present invention;

FIG. 1(b) is an explanatory diagram of the waveform of the exciting current and the output oscillation waveform of a parametron;

Figure 10:
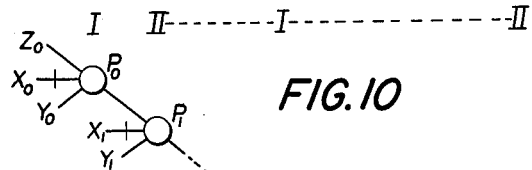

FIGS. 2(a) to 2(d) inclusive, show various symbolic representation of the parametron in FIG. 1;

FIG. 3(a) is a wave-form diagram of exciting waves for a parametron;

FIG. 3(b) is a diagram symbolizing a connection diagram of a plurality of parametrons according to the invention;

FIG. 3(c) is a circuit diagram of the parametrons of FIG. 3(b);

FIGS. 3(d), 3(e), and 3(f) are diagrams showing the sequence of oscillation of the parametrons under control of the currents I, II, and III applied sequentially as shown in FIG. 3(c);

FIG. 4 shows an elementary unit circuit for explanatory purpose of the principle of the invention, FIG. 5 shows one embodiment of the present invention, FIGS. 6 and 7 are wiring diagrams of specific applications of the circuit shown in FIG. 5 using the symbols shown in FIG. 2, and FIGS. 8, 9, 10, 11, and 12 are wiring diagrams for illustrating various applications of the circuit according to the present invention.

According to the present invention, parameter-excited resonator circuits of the type invented by Eiichi Goto of Tokyo University are utilized as computing circuit elements, such elements are called "Parametron" circuits.

The basic principle of a "parametron" is that, when the inductance of a coil or the capacitance of a capacitor forming an element of an L-C resonator is subjected to a sinusoidal variation of a frequency $2f$, $f$ being the resonant frequency of the resonator, an amplified and stable oscillation of a frequency $f$ and of a definite amplitude is built up in the resonator.

Making the parameter change is called "parametrical excitation" and the phenomenon, the electric voltage produced by the parametrical excitation, is called "parametric oscillation." That is, the dynamic principle of the Parametron is based on parametric excitation and in which the signals, having the phase 0 or 180° correspond to 0 or 1 in a "binary system" of notation. And so, its principle is fundamentally different from the ordinary principle in which 0 or 1 in "binary code system" correspond to whether there is an electric voltage or not, as for example, in a flip-flop circuit, using electric tubes, transistors and ferro-resonant devices.

Referring to FIG. 1(a) showing a typical parametron, primary windings and secondary windings are inductively coupled with a pair of balanced non-linear reactors comprising two terraidal, non-linear, saturable magnetic cores $L_1$ and $L_2$, respectively, made of ferromagnetic material such as ferrite. The windings are connected in series but with reversed polarities, so that the voltage applied to the primary terminals 1 and 2 does not appear across the output terminals 3 and 4. A capacitor C and a damping resistor R are connected in parallel across the output terminals to form a resonator circuit. The inductance of a winding on a core such as "Ferrite" is changed by the current through it. When an exciting sinusoidal current having a frequency of, for example, 1 mc. (2×500 kc.) is applied to the primary terminals 1 and 2, provided that the resonant frequency of the resonator is 500 kc., an oscillation wave of the resonant frequency 500 kc. is obtained across the output terminals 3 and 4. A direct current bias may be superposed on the exciting sinusoidal current. This direct current is needed to move the operating region to the non-linear portion or region of the B-H characteristic curve. By this the inductance of the winding on the core is changed by the exciting sinusoidal current.

For the inductance of the winding on the core to be changed by the exciting current having the frequency $2f$, the zero of the amplitude of the exciting current coincides with the zero of the amplitude of the output oscillation wave. This means that one phase of the output oscillation wave is determined by the exciting current. If this phase is 0 radian, it is determined, as mentioned later, by the weak control current, whether the phase becomes 0 radian or $\pi$ radian. When a weak control current having a frequency equal to the resonant frequency (500 kc.) is applied to the resonator circuit through a resistor $r$ from the input or control terminals 5 and 6 before the application of the exciting current to the exciting terminals 1 and 2, resonant oscillation wave of 0 radian phase or of $\pi$ radian phase is built up depending upon whether the phase of the control wave is within the region of $$0 \pm \frac{\pi}{2} \text{ or } \pi \pm \frac{\pi}{2}$$

The resistor R is designed so as to cause the oscillation wave to disappear rapidly as soon as the exciting wave is cut off, and the resistor $r$ is a coupling resistor which enables the impression of the control wave with a suitable coupling coefficient. When a plurality of control waves are simultaneously applied to the parametron through respective control terminals 5—6, 5—6 and 5—6″, by way of respective coupling resistors $r$, $r'$ and $r''$, the phase of the output oscillation wave will be determined by the phase of the resultant of these control waves.

FIG. 1' shows the exciting current wave form and the oscillated voltage wave form. In FIG. 1', we can recognize the weak control wave, amplification period, period of oscillation stablized voltage, damping oscillation period and the connection between them. There are two kinds of oscillating voltages in the stabilized period, which are respectively shown as a dotted line and a solid line. There is the phase difference 180° between them and either of the two oscillations is decided by either weak control wave (a dotted line or a solid line).

In order simplify the illustration, a convention is established here. A "parametron" is symbolically represented as shown in FIG. 2(a), in which the exciting terminals and one of the output terminals are omitted and the other output terminal 4 only is shown. The input or control terminals 6, 6' and 6" are shown, but the common input terminal 5 is not shown. The control terminals 6, 6', 6", must always be odd in number. The convention also includes that a negative circuit associated with a parametron and capable of reversing the phase of control and oscillation waves by suitable means (i.e. $\pi$ radian phase-shifting circuit), which serves to represent a logical negation, is represented by the symbol of FIG. 2(b). From logical consideration, it will be seen that the circuit 2(a') including a negative circuit (b) in each of the input and output connections, performs the same function as that of the circuit 2(a). It is further conventioned that when certain control terminals are always impressed with waves of a fixed phase of either 0 radian or $\pi$ radians, such terminals are not shown, and instead, signs of + or −, of a number equal to the number of the not-shown terminals, are given within the circle representing a parametron. Thus, in case the terminal 6" shown in FIG. 2(a) is always impressed with a control wave having a fixed phase of 0 radian, the circuit is represented by the symbol shown in FIG. 2(c), whereas in case the terminal 6" is always impressed with a wave having a fixed phase of $\pi$ radians, the circuit is represented by the symbol shown in FIG. 2(d).

When a plurality of unit parametrons (each of them will be termed a "parametron element" in the following description) are so cascaded that the oscillation output of one parametron element is suitably branched and the outputs from a plurality of parametron elements are impressed together upon one parametron element as control waves, and each group of the parametron elements belonging to one and the same cascade stage is excited in sequence, respectively, by each of the exciting waves such as shown by I, II, and III, in FIG. 3a, the exciting waves slightly overlapping one another, then the oscillation outputs of the parametron elements which are applied with the exciting wave I, control the phases of the oscillation outputs of those impressed with the exciting wave II, so as to restrict the phases to either one of 0 radian and $\pi$ radians.

In the same way as the above, the outputs of parametron elements applied with the exciting wave II control the phases of the oscillation outputs of those impressed with the exciting wave III, and the outputs of the elements applied with the exciting wave III can control the phases of the oscillation outputs of the elements which are included in the next succeeding stage and impressed with the exciting wave I, and so forth. In other figures of the drawings, the numbers I, II, and III shown under the parametron elements represent the corresponding one of the three exciting waves which is to be applied to each element.

FIG. 3(b) shows an example of the circuit diagram, connecting parametron $P_0$, $P_1$, $P_3$ and $P_4$. FIG. 3(c) is a detailed schematic view of FIG. 3(b) and shows in detail how parametrons $P_0$, $P_1$ and $P_2$ are excited by the existing wave I, parametron $P_3$ by the exciting wave II and parametron $P_4$ by the exciting wave III. An inverse phase transformer N is connected between $P_0$ and $P_3$. The excitation by the wave I induces oscillations of $P_0$, $P_1$ and $P_2$ as shown in FIG. 3(d) and its voltages are transmitted to $P_3$, from $P_0$ with inverse phase and from $P_1$, $P_2$ with normal phase. In parametron $P_3$, these 3 waves are connected by resistor and appear on the both ends of the tuning circuit of P. Subsequently, $P_3$ is excited by the exciting current II and it has the phase, decided by the current II. As soon as $P_3$ oscillates, the current I is cut off and only $P_3$ oscillates as drawn in FIG. 3(e). $P_3$ is connected to $P_4$ and on the both ends of the tuning circuit of $P_4$, the same phase voltage as $P_3$ appears. Subsequently, the excitation of $P_4$ by the exciting current III induces the oscillation of $P_4$ with the phase, decided by the weak control wave (current III). After the current II is cut off, only $P_4$ oscillates as shown in FIG. 3(f). And so on, the signal is successively transmitted by parametrons.

FIG. 4 shows an elementary unit circuit in the present invention, which is capable of giving a carry for addition or a borrow for subtraction when three input signals each representing binary numbers $x$, $y$, and $z$ respectively are applied to the input terminals.

If we assume for simplicity that the rectangle P in FIG. 4 consists of a single parametron element, and that all input signals have substantially equal amplitudes, though they may be different in phase, then the phase of the output wave is decided by a majority of the three inputs $x$, $y$, $z$, representing either binary 1 or 0. Therefore, the phases of the output waves $w$ corresponding to all the possible combinations of the phases of input waves $x$, $y$, $z$, are listed in the following Table 1, wherein the phase of the input wave, $\bar{x}$, that is the reversed phase of $x$, is shown in addition for use in a subtractive operation.

*Table 1*

| $x$ | $\pi$ | $\pi$ | $\pi$ | $\pi$ | 0 | 0 | 0 | 0 |
|---|---|---|---|---|---|---|---|---|
| $\bar{x}$ | 0 | 0 | 0 | 0 | $\pi$ | $\pi$ | $\pi$ | $\pi$ |
| $y$ | $\pi$ | $\pi$ | 0 | 0 | $\pi$ | $\pi$ | 0 | 0 |
| $z$ | $\pi$ | 0 | $\pi$ | 0 | $\pi$ | 0 | $\pi$ | 0 |

Output phase of P   $w$  $\pi$  $\pi$  $\pi$  0  $\pi$  0  0  0

On the other hand, it will be readily seen from arithmetical consideration that carrys for additive operations ($x+y+z$) and borrows for subtractive operations ($x-y-z$) relating to the three binary numbers $x$, $y$, and $z$ are respectively given in the following Tables 2 and 3 for all the possible combinations.

*Table 2*

| $x$ | 1 | 1 | 1 | 1 | 0 | 0 | 0 | 0 |
|---|---|---|---|---|---|---|---|---|
| $y$ | 1 | 1 | 0 | 0 | 1 | 1 | 0 | 0 |
| $z$ | 1 | 0 | 1 | 0 | 1 | 0 | 1 | 0 |

Output phase of P   $w$  1  1  1  0  1  0  0  0

*Table 3*

| $x$ | 1 | 1 | 1 | 1 | 0 | 0 | 0 | 0 |
|---|---|---|---|---|---|---|---|---|
| $y$ | 1 | 1 | 0 | 0 | 1 | 1 | 0 | 0 |
| $z$ | 1 | 0 | 1 | 0 | 1 | 0 | 1 | 0 |

Output phase of P   $w$  1  0  0  0  1  1  1  0

(1 corresponds to phase $\pi$, while 0 corresponds to phase 0).

It is seen from comparison of these tables that only a negative circuit as shown in FIG. 2(b) is necessary to be inserted in the input circuit of $x$, in order to change a carrying circuit to a borrowing circuit.

It is now obvious from the above descriptions that a carrying circuit or a borrowing circuit can be formed from the parametron elements, and that the unit P may consist of any number of parametrons with similar effects obtained.

The circuit shown in FIG. 5 consists of a plurality of units P (FIG. 4) which are so cascaded in stages that two of the three input terminals of each stage are respectively impressed with signals representing each digit of two binary numbers X and Y and that the remainder of the input terminals of each stage is impressed with the output signal of the just preceeding stage in the carrying or borrowing circuit.

(1) $\quad X = 2^0 x_0 + 2^1 x_1 + 2^2 x_2 + \ldots + 2^n x_n$
(2) $\quad Y = 2^0 y_0 + 2^1 y_1 + 2^2 y_2 + \ldots + 2^n y_n$ Referring to FIG. 6, a wiring diagram of a borrowing circuit for subtraction, which is one particular case of the circuit in FIG. 5, is shown, wherein $w_n$ represent a borrowing number in a subtractive operation of $x_n - y_n - w_n - 1$. Consequently, (i) If $x_n = y_n$, then $w_n = w_n - 1$,
(ii) If $x_n > y_n$, i.e. $x_n = 1$, $y_n = 0$, then $w_n = 0$, and
(iii) If $x_n < y_n$, i.e. $x_n = 0$, $y_n = 1$, then $w_n = 1$.

Since the above relations are held for any value of $n$, if we assume that $x_n = y_n \ldots x_k - 1 = y_k - 1$, $(n \geq k+1 \geq 1)$, then for $x_k$, $y_k$, and $w_k - 1$, the above relations are represented as follows, (i)′ If $x_k = y_k$, then $w_k = w_{k-1}$,
(ii)′ If $x_k = 1$, $y_k = 0$, then $w_n = 0$, and
(iii)′ If $x_k = 0$, $y_k = 1$, then $w_n = 1$.

Since the two numbers X and Y are represented as shown in the Equations 1 and 2, respectively, the above-mentioned condition (ii)′ means $X > Y$, and (iii)′ means $X < Y$. Further, if $x_n = y_n, \ldots x_0 = y_0$ are all held, that is if X is equal to Y, then $w_n$ becomes equal to the number corresponding to the signal for the input terminal $z_0$ of the first stage parametron $P_0$.

To summarize, (i) If $X = Y$, then $w_n = z_0$,
(ii) If $X > Y$, then $w_n = 0$, and
(iii) If $X < Y$, then $w_n = 1$.

It should be pointed out that in case a signal representing binary 1 is applied to the input terminal $z_0$ of the first parametron element $P_0$, $w_n = 0$ when $X > Y$, while $w = 1$ when $X \leq Y$; and in case a signal representing binary 0 is applied to the input terminal $z_0$, $w_n = 0$ when $X \geq Y$, while $w = 1$ when $X < Y$. Thus, in any case, the numerical relation between X and Y are determined by examining the value of $w_n$ by suitable known means, not shown.

Referring to FIG. 7, a wiring diagram of a carrying circuit for addition, which is another particular case of the circuit of FIG. 5, is shown, wherein $w_n$ represent a carry number upon an additive operation of $x_n + y_n + w_{n-1}$.

As pointed out hereinbefore in connection with FIG. 5, two of three input terminals of each stage $p_0 \ldots p_n$ are respectively impressed with signals representing each digit of two binary-numbers X and Y, that is $(x_0, y_0) \ldots (x_n, y_n)$, and the remainder of the input terminals of each stage is impressed with the output carrying signal of the just preceeding stage. Thus, in quite a similar way as the last mentioned borrowing circuit for subtraction, (i) If $x_n = y_n = 1$, then $w_n = 1$,
(ii) If $x_n \neq y_n$, then $w_n = w_{n-1}$, and
(iii) If $x_n = y_n = 0$, then $w_n = 0$.

The above relations are held for any value of $n$, and if we assume that $x_n \neq y_n, \ldots x_{k+1} \neq y_{k+1} (n \geq k+1 \geq 1)$, then for $x_k$, $y_k$, $w_{k-1}$, the above relations are expressed as follows:

(i)′ If $x_k = y_k = 1$, then $w_n = 1$,
(ii)′ If $x_k \neq y_k$, then $w_n = w_{k-1}$, and
(iii)′ If $x_k = y_k = 0$, then $w_n = 0$.

Since the two numbers X and Y are represented as shown in the Eq. 1 and 2, respectively, and the number $x_0 \ldots x_n, y_0 \ldots y_n$ can only take 1 or 0, the above-mentioned, condition (i)′ means $X + Y > 2^{n+1}$, and (iii)′, means $X + Y < 2^{n+1} - 1$. Further, if $x_n \neq y_n \ldots x_0 \neq y_0$ are all held, that is $X + Y = 2^{n+1} - 1$, then $w_n$ becomes equal to the number corresponding to the signal for the input terminal $z_0$ of the first stage parametron $P_0$.

To summarize, (i) If $X + Y \geq 2^{n+1}$, then $w_n = 1$,
(ii) If $X + Y = 2^{n+1} - 1$, then $w_n = z_0$, and
(iii) If $X + Y < 2^{n+1} - 1$, then $w_n = 0$.

Thus we can determine the numerical relations between two binary numbers X and Y, by means of such a circuit. Further, it should be pointed out that in case a signal representing binary 1 is applied to the input terminal $z_0$ of the first parametron element $p_0$, $w_n = 0$ when $X + Y < 2^{n-1} - 1$, while $w_n = 1$ when $X + Y \geq 2^{n-1} - 1$; and in case a signal representing binary 0 is applied to the input terminal $z_0$, $w_n = 0$ when $X + Y < 2^{n+1}$, while $w_n = 1$ when $X + Y \geq 2^{n+1}$. Thus, in any case, the numerical relations between X and Y are determined by examining the value of $w_n$.

In FIG. 8 are shown a pair of circuits of FIG. 6 connected in parallel, wherein one is impressed with a fixed signal 0 to its first stage input $z_0$, and the other with a fixed signal 1, and wherein one of the two output signals $w_n'$ are impressed upon a separate parametron $p_R$ through a negative circuit, while the other of the two output signals $w_n$ is directly impressed upon the last mentioned parametron, whereby the equality of two numbers can be determined. According to the preceding discussion, it will be apparent that if $X > Y$, then $w_n = 0$, $w_n' = 0$; if $X = Y$, then $w_n = 1$, $w_n' = 0$; and if $X < Y$, then $w_n = 1$, $w_n' = 1$. Since the input signals of parametron $p_R$ consists of $w_n$, a negation of $w_n'$, and a fixed input (−), i.e. binary 0, if we examine the output signal from the parametron $p_R$ for the above-mentioned three cases, it will readily be seen that if $X > Y$, then $w_R = 0$; if $X = Y$, then $w_R = 1$; and if $X < Y$, then $w_R = 0$. Thus, we can check the relation $X = Y$ between any two numbers, by the fact that the output signal $w_R$ can take 1 only when X is equal to Y.

In FIGS. 9(a) and 9(b), respectively, are shown a pair of circuits of FIG. 7 connected in parallel, wherein one is impressed with a fixed signal 0 to its first stage input $z_0$, and the other with a fixed signal 1, and wherein the two output signals are both impressed upon a separate parametron $p_R$, whereby the relation $X + Y = 2^{n+1} - 1$, between two numbers X and Y are determined. From the aforementioned relations, it will be seen that if $X + Y < 2^{n+1} - 1$, then $w_n = 0$, $w_n' = 0$; if $X + Y = 2^{n+1} - 1$, then $w_n = 1$, $w_n' = 0$; and if $X + Y > 2^{n-1} - 1$, then $w_n = 1$, $w_n' = 1$. Referring to FIG. 9(a), one of the two output signals $w_n$ are impressed directly and the other of them $w_n'$ through a negative circuit, upon a separate parametron $p_R$ just in the same way as shown in FIG. 8. In this case, the output signal $w_R$ can take 1 only when $X + Y = 2^{n+1} - 1$, otherwise takes 0. Referring to FIG. 9(b), the parametron $p_R$ is applied with three input signals, $w_n$, $w_n'$ and a control input $v$. In this case the output signal $w_R$ takes the following values:

*Table 4*

| | $X+Y<2^{n+1}-1$ | $X+Y=2^{n+1}-1$ | $X+Y>2^{n+1}-1$ |
|---|---|---|---|
| $v=0$ | 0 | 0 | 1 |
| $v=1$ | 0 | 1 | 1 |

The circuit in FIG. 10 performs the same function as that of the circuit in FIG. 8, but the former includes only one borrowing circuit as shown in FIG. 6, the input signal $z_0$ corresponding to 0. Whenever a determination of the equality of two numbers is required, the value of $Z_0$ is subjected to a variation from 0 to 1. When the value of the input $X_0$ varies from 0 to 1, $w_n$ varies from 0 to 1 only when $x = y$, and if $x \neq y$ the output signal $w_n$ can take an invariable value of either 0 or 1 irrespective of the variation in $Z_0$. Accordingly, we can determine the relation between X and Y, if a detecting circuit is provided to detect the above variation in $w_n$.

An example embodying such a detecting circuit is shown in FIG. 10, in which the parametron $p_r$ is applied with an output signal $w_n$ of the last stage directly, a negation of $w_n$ through a suitable delay circuit D and a negative circuit $w_n^*$, and a fixed input signal of binary 0. Then, it will readily be seen that if $w_n$ is representative of an invariable value of either 0 or 1, $w_R$ is always representative of condition 0 because of $w_n^* \neq w_n$, while at the instant $w_n$ varies from 0 to 1, $w_R$ becomes 1 since $w_n^*$ remains 1 due to the delay circuit. Such a condition persists until $w_n$ reaches the parametron $p_R$ through the delay circuit, thereupon $w_R$ restores to condition 0, thus we can determine the relation $X=Y$.

Figure 11:
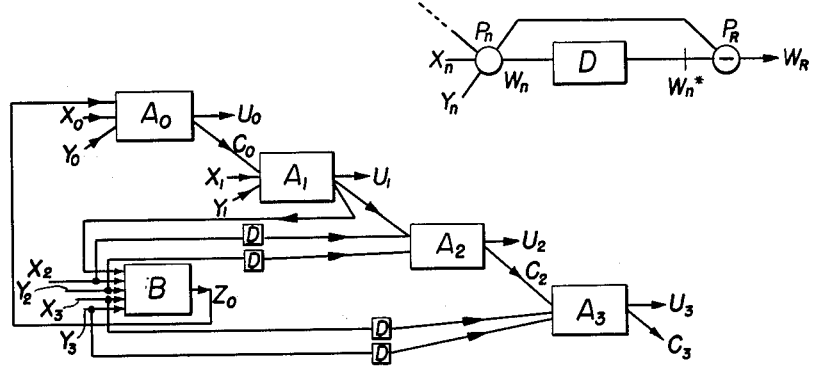
Figure 12:
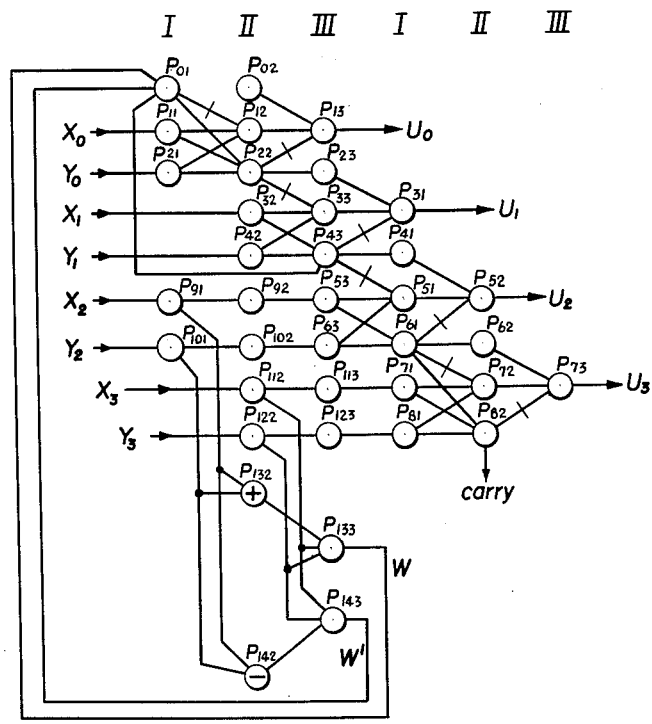

FIGS. 11 and 12 show an application of the circuit shown in FIG. 9 to an adder for the purpose of promoting the operation.

FIG. 11 is a block diagram of such an adder, wherein each of the units A receives three input signals $x$, $y$, and $c$, and sends out the ersultant $x+y+c$ as $u$, and a carry number as $c$ to the next succeeding stage. In FIG. 11, four such added units are cascaded to form a parallel type binary adder for four orders, and two numbers, that is, $$X = (2^0 \cdot x_{00} + 2^1 \cdot x_{01} + 2^2 \cdot x_{02} + 2^3 \cdot x_{03})$$
$$+ (2^4 \cdot x_{10} + 2^5 \cdot x_{11} + 2^6 \cdot x_{12} + 2^7 \cdot x_{13})$$
$$+ \text{------------------------}$$
$$+ \text{------------------------}$$
$$Y = (2^0 \cdot y_{00} + 2^1 \cdot y_{01} + 2^2 \cdot y_{02} + 2^3 \cdot y_{03})$$
$$+ (2^4 \cdot y_{10} + 2^5 \cdot y_{11} + 2^6 \cdot y_{12} + 2^7 \cdot y_{13})$$
$$+ \text{------------------------}$$
$$+ \text{------------------------}$$

are added for time parallel within the parentheses, but serially between the parenthesis. In other words, $x_{00}$, $x_{01}$, $x_{02}$, $x_{03}$, $y_{00}$, $y_{01}$, $y_{02}$, $y_{03}$ are subjected to an additive operation simultaneously at an instant, and then $x_{10}$, $x_{11}$, $x_{12}$, $x_{13}$, $y_{10}$, $y_{11}$, $y_{12}$, $y_{13}$ are subjected to an additive operation simultaneously at the next instant.

In the latter operation, the carry number from the uppermost order of the first four orders must be added to the number of the lowermost in the second four orders. Since the above-mentioned send-out of a carry number $c_3$ from $A_3$ is later than the application of the next four digits within the second parentheses to the adder in the case of a parametron adder, the carry number from the unit $A_3$ cannot be fed back directly to the first unit $A_1$. Therefore, a circuit B corresponding to that in FIG. 9(b) is provided, and the upper two numbers within the parenthesis $x_2$, $x_3$, $y_2$, $y_3$, are applied to this circuit earlier by an appropriate time interval D than they are applied to the corresponding units of the adder. Thus, the earlier carrying operation makes it possible that a carry number $z_0$ from the uppermost order of the preceding operation is applied to the unit $A_0$ in coincidence with the application of the lowermost number within the next succeeding parenthesis.

FIG. 12 shows the circuit of FIG. 11 in detail, wherein the right-hand figures of the suffixes appended to the parametron elements P represent the number of the exciting wave according to the three-step exciting method. The four groups of parametrons, $P_{02}$, $P_{12}$, $P_{22}$, $P_{13}$, $P_{23}$, $P_{33}$, $P_{43}$, $P_{31}$, $P_{41}$, $P_{51}$, $P_{61}$, $P_{52}$, $P_{62}$, $P_{72}$, $P_{82}$, $P_{73}$; form four adder units $A_0$, $A_1$, $A_2$, $A_3$, which give the sums $u_0$, $u_1$, $u_2$, $u_3$, respectively, from the parametrons $P_{13}$, $P_{31}$, $P_{52}$, $P_{73}$, and also the carry numbers $c_0$, $c_1$, $c_2$, $c_3$, respectively, from the parametrons $P_{22}$, $P_{43}$, $P_{61}$, $P_{82}$. Further, the circuit B consists of five parametrons $P_{132}$, $P_{133}$, $P_{142}$, $P_{143}$, $P_{01}$ which correspond to the parametrons $P_0$, $P_1$, $P_0'$, $P_1'$, $P_R$ in FIG. 9(b). The input signals 1 and 0 for the parametrons $P_0$ and $P_0'$ are substituted by the notations + and − in the circles representing the parametron $P_{132}$ and $P_{142}$, respectively, and one input corresponding to the input $v$ for $P_R$ is sent to $P_{01}$ from $P_{43}$. The other parametrons in the circuit of FIG. 12 are provided both to give a delay of D and to receive input signals.

Each of the binary numbers shown on the first lines of the aforementioned equations representing X and Y, $x_{00}$, $x_{01}$, $x_{02}$, $x_{03}$; $y_{00}$, $y_{01}$, $y_{02}$, $y_{03}$ are impressed respectively to the left-end terminals $x_0$, $x_1$, $x_2$, $x_3$, $y_0$, $y_1$, $y_2$, $y_3$. It will be understood that the carry number to the order of $2^4$, cannot be fed back directly from $P_{82}$ to $P_{01}$, since it must be impressed on the parametron $P_{01}$ with a delay of only 1 cycle (3 exciting steps). As described hereinbefore, the output $w$ from the parametron series $P_{132}$, $P_{133}$ is representative of condition 1 when $$\Sigma_2 = (2^2 x_2 + 2^3 x_3) + (2^2 y_2 + 2^3 y_3)$$

is greater than $2^4 - 2^2$, while the output $w_2$ from the parametron series $P_{142}$, $P_{143}$ is representative of condition 1 when $\Sigma_2$ is greater than $2^4$. The above values $w$, $w'$, and the carry number $v$ to the order of $2^2$ from the sum $$\Sigma_1 = (2^0 x_0 + 2^1 x_1) + (2^0 y^0 + 2^1 y_1)$$

are applied as inputs to the parametron $P_{01}$. Since the carry number to the order of $2^4$ takes 1, when the sum $$\Sigma = \Sigma_1 + \Sigma_2 = (2^0 x_0 + 2_1 x^1 + 2^2 x_2 + 2^3 x_3) + (2^0 y_0 + 2^1 y^1 + 2^2 y_2 + 2^3 y_3)$$

is greater than $2^4$, if $\Sigma_2 \geqq 2^4$, then of course $\Sigma \geqq 2^4$, thus $w=1$ and $w'=1$ are both held. Accordingly the output from $P_{01}$ assumes condition 1 irrespective of the value $v$.

Since $\Sigma_1$ is not greater than $2^3 - 2$, if $\Sigma_2 \leqq 2^4 - 2^3$, then $\Sigma$ must be smaller than $2^4$. In this case, $w=0$ and $w'=0$ are both held, and the output from $P_{01}$ assumes condition 0 irrespective of the value $v$. While, if $\Sigma_2$ is equal to $2^4 - 2^2$, $\Sigma$ is equal to or greater than $2^4$ as long as $\Sigma_1 \geqq 2^2$ is held, that is, the carry number $v$ assumes condition 1. In this case, $w=1$ and $w'=0$ are both held, and the output from $P_{01}$ coincide with $v$. Thus, it will be seen that the output from $P_{01}$ favorably coincides with the carry number from the order of $2^4$, and that it occurs in coincidence with the application of the next succeeding input digit.

In practice, we prefer to use parametron elements shown in FIG. 1 with the following data:

Magnetic cores—L material manufactured by Tokyo Electro-Chemical Co. Ltd., Ferrite of 4 mm. external diameters and 2 mm. internal diameters.
Primary windings—1 turn each.
Secondary windings—11 turns each.
C=5000 $\mu\mu$farads.  R=300 ohms.  r=10K ohms.
Exciting current—1 amp. D.C.—2 mc. 0.8 amp. A.C.
Output signal—1 mc. 3 volt A.C.

While I have shown and described certain preferred embodiments of my invention, other modifications thereof will readily occur to those skilled in the art and I therefore intend my invention to be limited only by the appended claims.

I claim:

1. In a binary computing arrangement, in combination, a cascade of parametron circuits connected in stages, each stage comprising at least one parametron, each parametron comprising a resonant output circuit for generating a predetermined output oscillation waveform having a predetermined frequency and one of two different phases with a phase displacement of 180 degrees from each other with said phases corresponding to conditions "0" and "1," means for applying to at least one resonant circuit of each stage one of three discrete exciting current waveforms of twice said resonance frequency for simultaneously exciting the parametrons of an individual stage and for exciting the stages in a predetermined sequence thereby to generate the output resonant oscillation of the resonant circuit of at least one parametron of each stage in a sequence corresponding to said predetermined sequence, means connected in each parametron for coupling said means for applying said exciting current to the resonant output circuit, means at each stage successively receptive of two different phase control waveforms for each stage both having different phases connected to provide said control waveforms as inputs to said resonant circuit of successive stages for controlling the phase of the output oscillation waveform as a function of the resultant phase of the phase control waveforms and the output wave form of the preceding stage in combination with said exciting currents, means connecting the output of each stage other than the last stage as a contol waveform input to the resonant circuit of the next successive stage, the two phase control waveform inputs to the successive stages being representative of the digits of binary numbers $x$ and $y$, means receptive of a third phase control waveform representative of a third binary number $z$ and connected for controlling the phase of the output oscillation of the resonant circuit of the first stage, and means for examining the output waveform of the last stage resonant circuit to determine the numerical relation between the binary numbers $x$ and $y$.

2. In a binary computing arrangement, in combination, a cascade of parametron circuits connected in stages, each stage comprising at least one parametron, each parametron comprising a resonant output circuit for generating a predetermined output oscillation waveform having a predetermined frequency and one of two different phases with a phase displacement of 180 degrees from each other with said phases corresponding to conditions "0" and "1," means for applying to at least one resonant circuit of each stage one of three discrete exciting current waveforms of substantially equal intensity and having a frequency of twice said resonance frequency for simultaneously exciting the parametrons of an individual stage and for exciting the stages in a predetermined sequence thereby to generate the output resonant oscillation of the resonant circuits of at least on parametron of each state in a sequence corresponding to said predetermined sequence, at least one non-linear element in each parametron for inductively coupling said exciting current feeding means to the resonant output circuit, means at each stage successively receptive of two different phase control waveforms for each stage both having different phases and of low and substantially equal intensity connected to provide said control waveforms as inputs to said resonant circuit of successive stages for controlling the phase of the output oscillation waveform as a function of the resultant phase of the phase control waveforms and the output waveform of the preceding stage in combination with said exciting currents, means connecting the output of each stage other than the last stage as a control waveform input to the resonant circuit of the next successive stage, the two phase control waveform inputs of the successive stages being representative of the digits of binary numbers $x$ and $y$, means receptive of a third phase control waveform representative of a third binary number $z$ and connected for controlling the phase of the output oscillation of the resonant circuit of the first stage and means for examining the output waveform of the last stage resonant circuit to determine the numerical relation between the binary numbers $x$ and $y$.

3. In a binary computing arrangement according to claim 2, in which said stages comprise two groups of cascade stages having their outputs connected in parallel, a final parametron comprising a common last stage, means connecting said parallel outputs of said groups to said final stage as phase control waveforms, and in which the third control waveforms applied to the first stage of each group have a fixed phase displacement of 180 degrees whereby one is always representative of condition "0" and the other of condition "1".

4. In a binary computing arrangement according to claim 3, including means for impressing a phase control waveform on said last stage other than the two output waveforms of the next preceding stages for controlling the phase of the oscillation output of the said common stage as a function of the resultant phase of three inputs.

5. In a binary computing arrangement according to claim 3 including means for reversing the phase of one of said two phase control waveforms applied to each of said stages to determine the equality between number $x$ and $y$.

6. In a binary computing arrangement according to claim 2, including a delay circuit connected between the last stage parametron and the next preceding stage parametron, input connections between the preceding resonant circuit output and the delay line, output connections between the delay circuit output and the resonant circuit of the last stage thereby to apply a variable phase control waveform to said last stage along with the oscillation waveform output of the next preceding stage, and means for reversing the output of said delay circuit prior to feeding it to the final stage resonant circuit as a phase control waveform, and the third phase control waveform applied to said first stage being representative of the condition "0" and "1".

7. In a binary computing arrangement according to claim 2, in which said stages comprise two groups of parametrons connected in parallel to form a parallel binary adder comprising four adders for four orders and two numbers in which the adders operate in sequence according to the sequence that said three exciting waveforms are applied to said stages, each adder including means for forming a carrying circuit in each adder for addition and for generating another output waveform representative of the numerical sum of all inputs to each resonant circuits of each stage and said output waveform of each stage being representative of a carry number, the third phase control waveforms applied to the first stage of each group being representative of the conditions "0" and "1" respectively, and including means for examining the carry outputs waveforms of certain stages for determining the necessity of a carry number from the corresponding order.

References Cited in the file of this patent

UNITED STATES PATENTS

| | | |
|---|---|---|
| 1,544,381 | Elmen et al. | June 30, 1925 |
| 1,884,845 | Peterson | Oct. 25, 1932 |
| 2,709,757 | Triest | May 31, 1955 |
| 2,721,947 | Isborn | Oct. 25, 1955 |
| 2,770,739 | Grayson et al. | Nov. 13, 1956 |
| 2,775,713 | Isborn | Dec. 25, 1956 |
| 2,815,488 | Von Neumann | Dec. 3, 1957 |